United States Patent
Griffiths (12)

(10) Patent No.: US 7,136,999 B1
(45) Date of Patent: Nov. 14, 2006

(54) METHOD AND SYSTEM FOR ELECTRONIC DEVICE AUTHENTICATION

(75) Inventor: Jonathan C. Griffiths, Fremont, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 917 days.

(21) Appl. No.: 09/597,198

(22) Filed: Jun. 20, 2000

(51) Int. Cl.
 *H04L 9/00* (2006.01)
 *H04K 1/00* (2006.01)
(52) U.S. Cl. .................. 713/168; 713/169; 380/270
(58) Field of Classification Search ............ 713/168, 713/169; 380/270
 See application file for complete search history.

(56) References Cited

U.S. PATENT DOCUMENTS 5,367,558 A * 11/1994 Gillig et al. ............ 455/426.1
6,600,902 B1 * 7/2003 Bell .......................... 455/41.2
6,772,331 B1 * 8/2004 Hind et al. ................ 713/151

FOREIGN PATENT DOCUMENTS

EP 0883318 A1 12/1998

OTHER PUBLICATIONS

"Specification of Bluetooth System—Core" v. 1. OA, Jul. 26, 1999, pp. 18-19, 95, 149-154, 169-170, 194-200, 226, 319, 537, 1029 and 1031.

* cited by examiner

*Primary Examiner*—Kambiz Zand
(74) *Attorney, Agent, or Firm*—Larry Liberchuk

(57) ABSTRACT

Electronic devices are authenticated to each other initially over a short-range wireless link. In particular, a user first enters a given authentication information in each device. Later, when the devices are out-of-range of the wireless link, they may be authenticated to each other without subsequent user input when one of the devices invites the other to exchange authentication information over an alternative communications link. If the authentication is successful, the devices may then communicate over the alternative communications link as if they were within range of the original wireless link.

17 Claims, 1 Drawing Sheet

METHOD AND SYSTEM FOR ELECTRONIC DEVICE AUTHENTICATION

BACKGROUND OF THE INVENTION

1. Field of the Invention

The present invention relates generally to electronic device authentication.

2. Description of the Related Art

In the Bluetooth Specification, "Specification of the Bluetooth System—Core", v.1.0A, Jul. 26th 1999, pp. 18–19, 95, 149–154, 169–170, 194–200, 226, 319, 537, 1029, and 1031, the so-called Bluetooth short range radio link between Bluetooth enabled devices is described, particularly, the Bluetooth frequency bands, the concept of master and slave devices, and security using authentication of devices. Bluetooth (BT) is a specification for small form factor, low-cost, short-range radio links between mobile PCs, mobile phones, and other such devices. Bluetooth radio arose out of an initiative among leaders in the telecommunication and computer industries to make a global standard for wireless connectivity. The standard relies on a low power radio link operating at 2.4 Gigahertz. Bluetooth-provisioned devices normally must be physically close to each other (i.e., within 100 meters) to communicate. Bluetooth includes a robust authentication mechanism that ensures that a Bluetooth device only communicates with other devices for which it is authenticated, and not with any random device that comes into its range. Bluetooth radio uses a fast acknowledgement and frequency hopping scheme to make the link robust. Devices avoid interference from other signals by hopping to a new frequency after transmitting or receiving a packet. Compared with other systems operating in the same frequency band, the Bluetooth radio typically hops faster and uses shorter packets. This makes Bluetooth radio more robust than other systems.

The Bluetooth authentication scheme works generally as follows. A user enters a numerical code (a personal identification number or PIN) in the two devices to establish a Bluetooth link for the first time. The PIN can be any number, but it must be the same on both devices. Once this is done, the devices communicate with each other using Bluetooth transceivers to verify that the PIN numbers match. If so, one device generates unique key information based on a device address, which is unique for each device. This unique key (generated by one of the devices) is stored in both devices and used to authenticate the two devices for any subsequent Bluetooth link between them. In particular, the key exchanged upon link initialization identifies a unique link and can be used reliably for subsequent authentication when the link is re-established.

The feature that ensures security in a Bluetooth system is the need for physical proximity to establish a link, i.e., the user must enter the numerical code on both devices when the devices are in close proximity. If the devices are more than 100 meters apart, the initial Bluetooth link cannot be established.

Wide area networks also use basic authentication to enable electronic devices to communicate with each other. The most common and popular wide area network is the Internet. Internet service providers typically restrict access on their servers to given users. Normally, this is achieved by requiring a prospective user (e.g., a user of a client machine running a web browser) to enter a userid and password combination.

BRIEF SUMMARY OF THE INVENTION

It is an object of the invention to authenticate a device first authenticated on a physically restrained network through another network.

It is a further object of the invention to simplify authentication of a device in a network by re-using a given authentication process in another network.

In accordance with the invention, a method of authenticating first and second electronic devices is provided, the method comprising:

upon link set-up over a short-range wireless link, executing an authentication protocol by exchanging authentication information between the first and second electronic devices to initially authenticate communication between the first and second devices;

later, when the first and second electronic devices are beyond the short-range wireless link, executing the authentication protocol by exchanging the authentication information between the first and second electronic devices over an alternate communications link, then only allowing communication between the first and second devices if the first and second devices had initially been successfully authenticated.

The invention is based upon the insight that once devices are authenticated on a restricted network, it is very simple to re-connect the devices through another, unrestricted network. In this respect, restriction can be determined by the way a system works, such as authentication in accordance with said Bluetooth Specification, or can be restricted physical access to premises such as an office.

In a preferred embodiment, the first and second electronic devices each have the capability of communicating with each other over at least a primary and a secondary communications link. The primary communications link is a given short-range wireless link. Preferably, the short-range wireless link conforms to a given protocol, namely, Bluetooth. The secondary communications link may be any alternative link such as a wide area network (WAN), a local area network (LAN), or the like. The devices are first authenticated over the primary link, with the user entering the same, given PIN code in both devices. After the devices verify that they share the same PIN code, they exchange key information. Later, when the devices are no longer within range to authenticate over the primary communications link using Bluetooth, one of the devices invites the exchange of key information automatically using the secondary communications link. If the other device can provide the key information requested, the devices are then authenticated to each other over the secondary communications link. In addition thereto a user may be requested to enter login data, such as a user name or a password. The foregoing has outlined some of the more pertinent objects and features of the present invention. These objects and features should be construed to be merely illustrative of some of the more prominent features and applications of the invention. Many other beneficial results can be attained by applying the disclosed invention in a different manner or by modifying the invention as will be described. Accordingly, a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
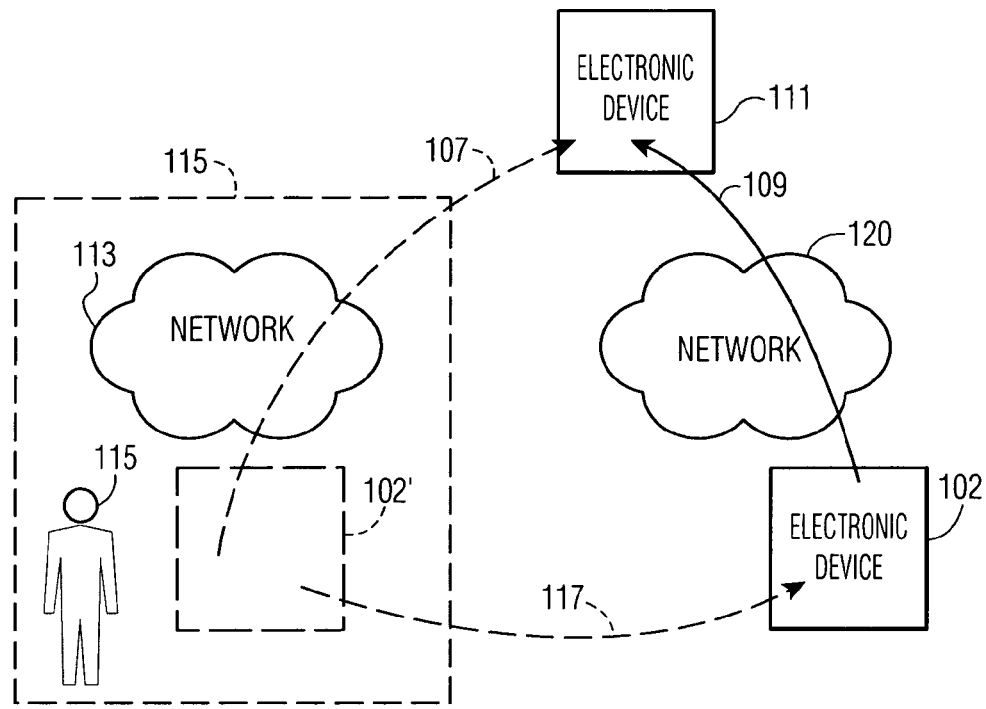
FIG. 1 is a block diagram illustrating an embodiment of the invention.
Figure 2:
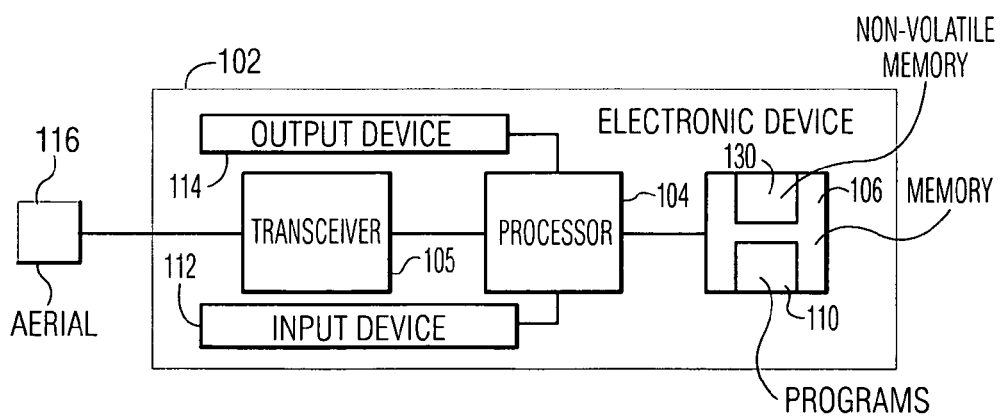
FIG. 2 is a block diagram of an electronic device according to the present invention.

FIG. 1 is a block diagram illustrating an embodiment of the invention. As used herein, an "electronic device" should be broadly construed to mean a computer (or a set of computers) of any type including, without limitation, a desktop computer, a workstation or server platform, a notebook computer, a diskless computer, a handheld computing device (e.g., personal digital assistant, business organizer, or the like), a communications device (e.g., cellular phone, smartphone, or the like) provisioned to include computing power, in-vehicle computing devices, or the like. Thus, as is well known, a given electronic device 102, as shown in more detail in FIG. 2, typically includes a processor 104, a memory 106 (e.g., RAM and ROM) for storing programs 110 executable by the processor 104, at least one input device 112 such as a keyboard or mouse, at least one output device 114 such as a monitor or display. Typically, each of the electronic devices includes hardware and software resources (not shown) to enable the devices to communicate with each other over a network 120 such as the Internet, an intranet, a local area network, a mobile radio network, or the like. The electronic device 102 can be a mobile phone, a personal digital assistent (PDA), a laptop computer, or any other suitable device. In FIG. 1, another electronic device 111 is shown. The electronic device 111 can be a web-server, an e-mail server, or some other database-like device.

When the device 102, e.g., a laptop, connects to the network 120, e.g. the Internet, its internet protocol address is determined and services such as a printer service and a calendar service are set up automatically. But before such services are set up the device 102 needs to be authenticated. Upon device authentication, the user may login to a service by providing a user name and password, for instance. The invention is mainly concerned with device authentication whereby authentication information is exchanged between devices.

According to the invention, each of the devices also includes a transceiver 105 to enable the devices to communicate over a communications link 107. Preferably, the communications link 107 is a short-range wireless link that conforms to a given radio protocol, e.g., Bluetooth. This is not a limitation of the present invention, however, as the alternative communications link 107 may be an infrared link, an acoustic link, or the like. In the preferred embodiment, the alternative communications link 107 is a "primary" link in the sense that the devices initially authenticate to each other over the link 107 link and then, later, authenticate to each other over a secondary link 109 such as the Internet, an intranet, or some other link. Thus, according to the preferred embodiment of the invention, the pair of electronic devices first authenticate using Bluetooth over a first link, the link 107 and then later authenticate (e.g., when the devices are out-of-range of the original wireless connection) over some alternative link, the link 109. In FIG. 1, such a successive device authentication at different locations is indicated by the electronic device 102 having been moved from a network 113 to which the device 102 has restrained access, to the unconstrained network 120. The network 113 is a so-called Bluetooth network, for instance, to which a user 115 has constrained access. When accessing the network 113, with the device 102' within network boundary 115, the user 115 needs to initially set-up the link 107 while the devices 102' and 111 are authenticated. Later, the device 102' moves to another location outside the constrained network, indicated with the device 102 and a dashed arrow 117. The device 102 may have an aerial 116 when the link 107 is a radio link. Instead of an aerial, an infrared transmitter/receiver may be used, when the link 107 is an infrared link.

In terms of Bluetooth, the devices 102'/102 and 111 may be so-called Bluetooth enabled devices, the device 102'/102 being a slave device and the device 111 being a master device. The concept of master and slave is defined on page 95 of said Bluetooth Specification. Authentication of Bluetooth enabled devices is described on pages 149–154 of said Bluetooth Specification. When the master and slave are out-of-range of the wireless or "primary" data link 107, however, they may still communicate with each other following authentication according to the present invention. In particular, slave device 102 first establishes a link to the master device 111 over the alternate or "secondary" link 109, which, as noted above, may be any convenient communications link such as the Internet, an intranet, a local area network, or the like. To establish this connection, as noted above, each of the devices 102 and 111 must include appropriate hardware and software resources (e.g., a modem, a TCP/IP stack, and the like) that are used for this purpose, as is well known. Once this connection is established, the master device 111 offers to use the authentication protocol of the primary data link 107 to facilitate device authentication. The primary data link authentication protocol may be one of several protocols offered during the attempt to establish a connection between the two devices 102'/102 and 111. The offer issued from the master device 111 invites the exchange of key information according to the authentication protocol of the primary data link, in the example given a Bluetooth protocol. If upon exchange the keys match, the devices 102'/102 are authenticated to communicate with each other.

In summary, an initial Bluetooth link setup and authentication procedure is carried out between a pair of electronic devices. Thus, for example, the BT-devices can be a home/office Internet server and a mobile phone, or any other suitable pair of devices. When the user of the mobile phone, for example, later wants to make a remote connection to the other device of the BT-enabled link, e.g., through another network such as the Internet, the same BT authentication protocol is used as with the initial BT-link setup so that communication by unauthenticated devices may be prevented. Thus, once the remote connection is secured by the initial BT-link setup procedure, i.e., devices other than legitimate authenticated devices can never use the mobile phone network to connect to the home server or network for remote re-connection of the BT-link if the user of the device had not first initiated the BT-link locally.

Security is enhanced with the invention by exchanging link key information because the link key information is established in a secure system. In the described example, security is assured by the requirement that the two devices be in physical proximity when establishing the link key. Userids or passwords need not be exchanged on subsequent logins, depending on the level of additional security required. An additional PIN may be used to access some services, possibly in a corporate environment.

Although specific embodiments of the present invention are described herein, they are not to be construed as limiting the scope of the invention. Many embodiments of the invention will become apparent to those skilled in the art in light of the teachings of this specification. For example, although the described embodiments use a wireless link to establish the link key, other similarly secure connection means such as infrared links or closed networks may be advantageously used. Also, although the described embodiments show authentication between two devices on two networks, authentication can be achieved on any number of networks between the two devices. The scope of the invention is only limited by the claims appended hereto.

The word "comprising" does not exclude the presence of other elements or steps than those listed in a claim.

Having thus described my invention, what I claim as new and desire to secure by Letters Patent is set forth in the following claims.

What is claimed is:

1. A method of authenticating first and second electronic devices, comprising:
   upon link set-up over a short-range wireless link, executing an authentication protocol by exchanging authentication information between the first and second electronic devices to initially authenticate communication between the first and second devices;
   later, when the first and second electronic devices are beyond the short-range wireless link, executing the authentication protocol by exchanging the authentication information between the first and second electronic devices over an alternate communications link, then only allowing communication between the first and second devices if the first and second devices had initially been successfully authenticated.

2. The method of claim 1, wherein the authentication information is an authentication key.

3. The method of claim 1, wherein the authentication information a password.

4. The method of claim 1, wherein the first device is a master device and the second device is a slave device.

5. The method of claim 1, wherein the short-range wireless link is a radio link.

6. The method of claim 1, wherein the short-range wireless link is an infra-red link.

7. The method of claim 1, wherein the link set-up occurs when the first and second devices are in physical proximity.

8. The method of claim 1, wherein the short-range wireless link conforms to a given RF protocol.

9. The method of claim 8, wherein the given RF protocol is Bluetooth.

10. The method of claim 1 wherein the link set-up step includes entry of a given personal identification number into each of the first and second electronic devices.

11. The method of claim 1, wherein the alternate communications link is a computer network.

12. The method of claim 1, wherein the first electronic device is a client and the second electronic device is a server.

13. A method of authenticating first and second electronic devices, comprising:
    upon link set-up over a first link, executing an authentication protocol by exchanging authentication information between the first and second electronic devices to initially authenticate communication between the first and second devices;
    later, when the first and second electronic devices are connected using a second link, exchanging the authentication information between the first and second electronic devices over the second link, then only allowing communication between the first and second devices if the first and second devices had initially been successfully authenticated.

14. An electronic device, comprising:
    a processor;
    and
    a memory loaded with a software routine executed by the processor (a) for generating authentication information useful in initially authenticating the electronic device to a another electronic device over a short-range wireless link, and (b) for later supplying the authentication information for later authentication of the electronic device to the other electronic device over an alternate communications link when the devices are beyond the short-range wireless link, then only allowing communication between the devices if the devices had initially been successfully authenticated.

15. The electronic device of claim 14, wherein the link set-up step includes entry of a given personal identification number into each of the first and second electronic devices.

16. The electronic device of claim 14, wherein the electronic device is a client and the second electronic device is a server.

17. A communications system, comprising:
    a first electronic device;
    a second electronic device;
    a first communications link over which the first and second electronic devices authenticate each other using a given protocol that includes a link set-up and the exchange of authentication information following the link set-up, the authentication information being used to initially authenticate communication between the first and second electronic devices; and
    a second communications link over which the first and second electronic devices later authenticate each other using the exchange of the authentication information, then only allowing communication between the first and second devices if the first and second devices had initially been successfully authenticated, wherein said first communications link and said second communications link are different types of links.

* * * * *